Patented Oct. 17, 1922.

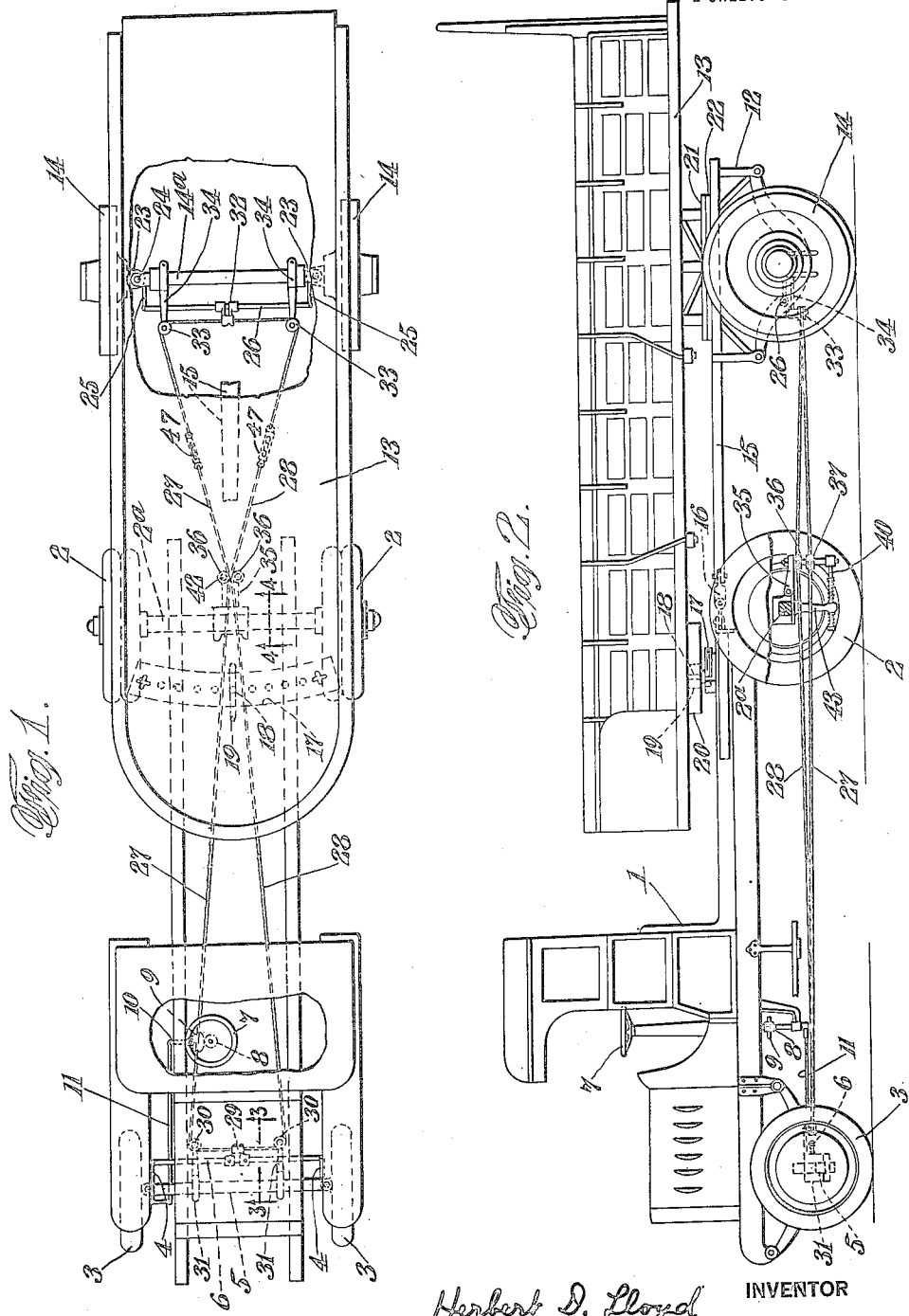

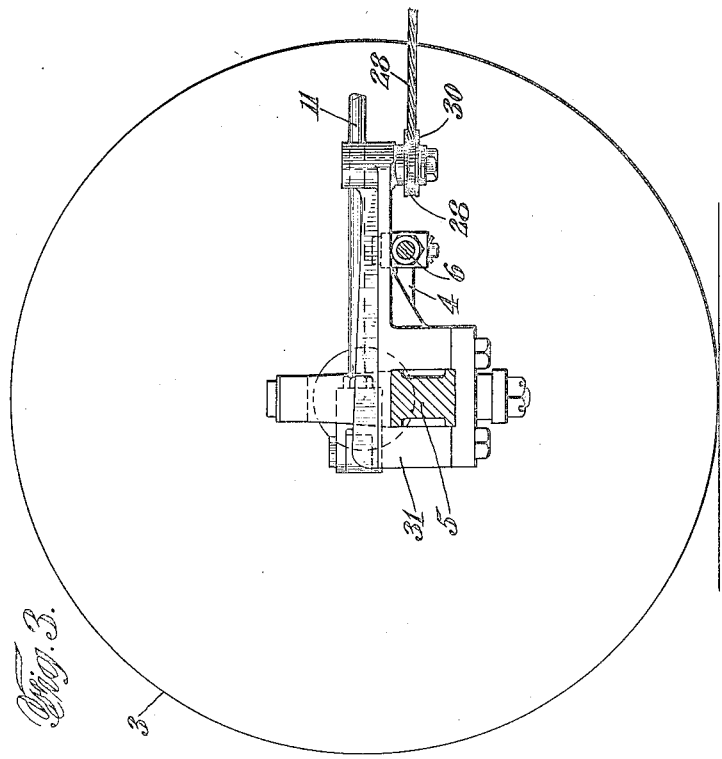
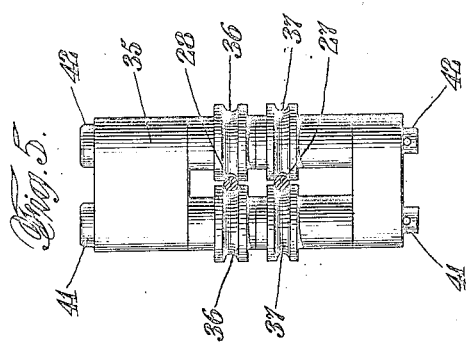
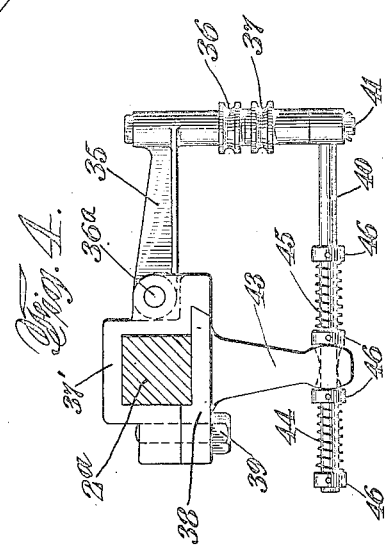

1,432,401

UNITED STATES PATENT OFFICE.

HERBERT D. LLOYD, OF KENT, CONNECTICUT, ASSIGNOR TO TRAILER TRANSPORTATION COMPANY, OF NEW YORK, N. Y., A CORPORATION OF DELAWARE.

CONTROLLING DEVICE FOR TRAILER VEHICLES.

Application filed July 9, 1919. Serial No. 309,559.

*To all whom it may concern:*

Be it known that I, HERBERT D. LLOYD, a citizen of the United States, residing at Kent, in the county of Litchfield and State of Connecticut, have invented a certain new and useful Controlling Device for Trailer Vehicles, of which the following is a specification.

The invention has for an object to provide a controlling device for trailer vehicles of such character that the trailer may be steered or controlled to assume the desired position with respect to the tractor, particularly when the vehicle is moving in a curved path.

Further objects and advantages of the invention will be in part obvious and in part specifically pointed out in the description hereinafter contained, in which is disclosed one embodiment of the invention; such embodiment, however, is to be considered merely as illustrative of its principle. In the drawings, Fig. 1 is a top view of a trailer vehicle, made according to the invention, certain of the parts being cut away for clearness.

Fig. 2 is a side view of the same, with a part of one of the driving wheels of the tractor cut away.

Fig. 3 is a sectional view taken on line 3—3 of Fig. 1, looking in the direction of the arrows.

Fig. 4 is a sectional view taken on line 4—4 of Fig. 1, looking in the direction of the arrows.

Fig. 5 is a front view of the device shown in Fig. 4.

I have shown in the drawings a tractor denoted generally by numeral 1, which may be of the usual type having driving wheels 2 carried on rear axle $2^a$ and front steering wheels 3 mounted on the usual axles 4 which are pivoted to stationary axle 5, and connected by the parallel rod 6. The steering device for the tractor is also illustrated as of common construction, consisting of a steering wheel 7 actuating a pinion 8, which meshes with a sector gear 9 on a rocker arm 10, a steering rod 11 being connected between one of the wheel axles 4 and such arm 10. As the particular type of tractor is not essential to this invention, it will not be described in greater detail.

In the present form, I have illustrated a trailer of the two wheel type, consisting generally of a framework 12, a flooring 13, and a pair of wheels 14, but it will be obvious that my invention is not limited to a trailer of the above type. The body of the trailer may be connected to the tractor in any suitable manner, preferably to permit free lateral swinging movement of the trailer, as by a draw bar 15, pivotally connected to the tractor at 16 by a structure similar to the one disclosed in my prior Patent No. 1299973, dated April 8th, 1919. The flooring 13 of the trailer may also be extended over the tractor and connected to the same through a roller bearing sector 17 and a pin 18 moving in a slot 19 in a block 20, as shown in my aforesaid patent. However, one only of the above connections between the trailer and tractor or other strain transmitting connection may be employed, whereby the pull of the tractor will be properly transmitted to the trailer. If both the above described draw bar connection and roller bearing sector connection be employed, a fifth wheel device may be interposed between the frame work of the trailer 12 and its flooring 13, as shown conventionally at 21 and 22 in Fig. 2. Such a fifth wheel device permits the trailer flooring and framework to assume different angles when the trailer swings laterally with regard to the tractor, which is necessary since the radius of swing will be defferent for the two parts of the trailer when both connections are employed.

In order that the angular position of the wheels 14 of the trailer may be properly controlled, I provide a steering device, preferably upon the tractor, whereby the operator may change the angle of such wheels to correspond to the direction in which he wishes the trailer to travel. In the present instance, the connections are made between the usual steering wheel 7 on the tractor, and wheels 14 of the trailer, whereby whenever the operator of the tractor turns the steering wheels of the tractor the trailer wheels will be positively turned to the proper angle to keep the trailer moving in the proper path with regard to the tractor.

The pair of wheels 14 are so mounted as to be angularly movable with regard to the frame work, or flooring, of the trailer, this being accomplished in the embodiment illustrated by means of wheel axles 23, pivoted at 24 to the axle $14^a$, and having arms 25 which are joined by a parallel rod 26.

Suitable connections are then made between the first mentioned steering device and the wheels 14, whereby the latter are positively actuated to assume the desired angular position. Where parallel rods, such as members 6 and 26 are employed respectively to turn the wheels 3 and 14, this connection may be made in a simple manner by tension members interposed between the two rods and transmitting the movement of rod 6 to rod 26. In the present form a pair of crossed cables 27 and 28 are fixed to the parallel rod 6 by means of a suitable clamp 29, and pulleys 30, supported from brackets 31, support the cables adjacent to the tractor parallel rod 6. A similar clamp 32, together with similar pulleys 33 and brackets 34 may also be employed to connect the cables 27 and 28 to the trailer parallel rod 26.

It will be obvious that, when crossed cables are employed the wheels 14 will be turned at an angle opposite to that assumed by the front wheels 3 of the tractor, when the latter are turned by the operator, and that the angle through which the trailer wheels are turned may be made greater, equal to or less than the angle of the front tractor wheels, as desired. It is preferred to design the apparatus so that the wheels 14 will follow closely the path of driving wheels 2 of the tractor.

Where the trailer is capable of free swinging movement with regard to the tractor, as by means of the draw bar 15, the crossing point of the cables may be located substantially beneath the pivot 16 between the draw bar and the tractor, whereby no undue strains on the cables will be imposed when the trailer turns angularly with regard to the tractor. In the present instance a cable guiding device is located at the crossing point of the cables, consisting of a bracket 35 (shown in detail in Figs. 4 and 5) and provided with upper and lower pairs of rollers 36 and 37, between which pairs of rollers the cables 28 and 27 are respectively guided. It is preferred to construct such guiding device to permit a certain amount of yield, for instance when the vehicle passes over an uneven road and the trailer moves up and down with regard to the tractor. As is shown particularly in Fig. 4, the bracket 35 may be pivoted by means of a pin 36ª to a clamp 37¹ attached to the rear axle 2ª of the tractor by means of a plate 38 and bolt 39, whereby the bracket 35 and the rollers 36 and 37 supported thereon may move upwardly or downwardly when strains are placed upon the cables. A rod 40 receives the roller shafts 41 and 42 and passes through a post 43 fixed to plate 38, springs 44 and 45 being interposed between collars 46 on such rod and normally tending to maintain the same, and the rollers 36 and 37. in normal position, but permitting such rollers to move upwardly or downwardly when necessary.

When a connection between the trailer and tractor is used of the type previously described, a certain amount of longitudinal play between the trailer and tractor is permitted, and the cables 27 and 28 should be loose enough to avoid undue strain during such movements. In Fig. 1 there are shown turn buckles 47 which may be adjusted to maintain cables 27 and 28 at the proper tension.

While a specific embodiment of the invention has been described, it is obvious that many changes may be made without departing from the spirit of the invention as defined in the following claims.

I claim:—

1. In combination, a tractor having a steering device including the usual parallel rod extending between the front wheel axles, a trailer connected thereto having a pair of wheels pivoted to a main axle and a parallel rod connecting the axles of said wheels, and crossed tension members connected between said two parallel rods to transmit lateral movement of said tractor steering rod to the trailer rod.

2. In combination, a tractor having a manually operable steering device mounted thereon, a trailer, connecting means between said tractor and trailer permitting relative up and down movements of the latter, said trailer also having means permitting angular movement between wheels of the trailer and its body, actuating members connected between said steering device and trailer wheels to turn the latter when the steering device is operated, a guide for said actuating members, and a yieldable mounting for said guide.

3. In combination, a tractor having a steering device including the usual parallel rod extending between the front wheel axles, a trailer connected thereto having a pair of wheels pivoted to a main axle and a parallel rod connecting the axles of said wheels, crossed tension members connected between said two parallel rods to transmit lateral movements of said tractor steering rod, and a yieldably mounted guide located on the tractor and receiving the tension members adjacent their crossing point.

4. In combination, a tractor having a manually operable steering device mounted thereon, a trailer, connecting means between said tractor and trailer permitting lateral swinging of the trailer, said trailer also having means permitting angular movement between wheels of the trailer and its body portion, and connecting mechanism between said manually operable steering device and the trailer wheels whereby the angle of said trailer wheels may be changed by the operation of said steering device, said mechanism being adapted to accommodate itself to different angular positions of the trailer.

5. In combination, a tractor having a steering device including the usual parallel rod between the front wheel axles, a trailer, a draw bar on the trailer body pivotally connected to the tractor and permitting the lateral swinging of the trailer, said trailer having a pair of wheels pivoted to a main axle and a parallel rod connecting the axles of said wheels, crossed cables connecting said parallel rods whereby the angle of said trailer wheels may be changed by the operation of the steering device, said cables crossing at a point substantially beneath the pivot of said drawbar, and a guide for the cables located at their crossing point.

6. In combination, a tractor and a trailer, connecting means between said tractor and trailer permitting up and down movement of the latter relative to the tractor, said trailer also having means permitting angular movement between a wheel of the trailer and its body portion, an actuating member extending from the tractor, and connected to the trailer wheel to control the angular position thereof, a guide for said member located on the tractor, and a yieldable mounting for said guide.

7. In combination, a tractor and a trailer, said trailer having means permitting angular movement between wheels of the trailer and its body, crossed flexible tension members extending from said tractor to the trailer and connected to said trailer wheels to control the angular position thereof, and a guide for said tension members mounted upon the tractor and located substantially at their crossing point to fix the position of such crossing point.

8. In combination, a tractor and a trailer, connecting means between said tractor and trailer permitting lateral swinging of the latter relative to the tractor, said trailer also having means permitting angular movement between wheels of the trailer and its body, crossed actuating members extending from the tractor and connected to said trailer wheels to control the angular position thereof, said tension members crossing substantially in the axis on which the trailer may swing laterally relative to the tractor.

9. In combination, a tractor and a trailer, connecting means between said tractor and trailer permitting lateral swinging of the latter relative to the tractor, said trailer also having means permitting angular movement between wheels of the trailer and its body, crossed actuating members extending from the tractor and connected to said trailer wheels to control the angular position thereof, said tension members crossing substantially in the axis on which the trailer may swing laterally relative to the tractor, and a guide for said members mounted on the tractor and located substantially at such crossing point.

10. In combination, a tractor and a trailer, connecting means between said tractor and trailer permitting lateral swinging of the latter relative to the tractor, said trailer also having means permitting angular movement between wheels of the trailer and its body, crossed actuating members extending from the tractor and connected to said trailer wheels to control the angular positions thereof, said tension members crossing substantially in the axis on which the trailer may swing laterally relative to the tractor, and a guide for said members mounted on the tractor and located substantially at such crossing point, said connecting means between the tractor and the trailer also permitting up and down movement of the latter relative to the tractor, said guide being yieldable in a substantially vertical plane.

In testimony that I claim the foregoing, I have hereunto set my hand this 7th day of July, 1919.

HERBERT D. LLOYD.